United States Patent

Parks, Jr.

[11] 4,148,414
[45] Apr. 10, 1979

[54] ROW CROP PLANTER

[76] Inventor: Earl R. Parks, Jr., 0141 W Rd. 700S, La Porte, Ind. 46350

[21] Appl. No.: 856,264

[22] Filed: Dec. 1, 1977

[51] Int. Cl.² ............................................. B65H 3/08
[52] U.S. Cl. .................................................. 221/278
[58] Field of Search ............... 221/160, 161, 162, 278, 221/251, 254, 211

[56] References Cited

U.S. PATENT DOCUMENTS 3,860,146   1/1975   Bauman et al. ...................... 221/211

Primary Examiner—Stanley H. Tollberg
Attorney, Agent, or Firm—Oltsch, Knoblock & Hall

[57] ABSTRACT

A row crop planter of the type having a rotating pressurized peripherally apertured seed drum within which are positioned seed distributing structure and a brush for releasing excess seeds from the drum in advance of the distributing structure, which is improved by the provision of air permeable a seed barrier located in the drum to prevent reattachment of seeds to the portion of the drum between the brush and the distributing structure.

8 Claims, 6 Drawing Figures

ROW CROP PLANTER

SUMMARY OF THE INVENTION

This invention relates to improvements in row crop planters, and particularly to planters constructed to plant multiple rows of seeds at predetermined intervals.

Row crop planters, such as those identified as 400 or 500 Cyclo Planters produced by International Harvester Corp., provide for delivery or deposit of seeds at selected spaced intervals in multiple rows, and are constructed for planting seeds of various types, such as corn, soybeans, beets and peas. Such planters are characterized by a seed hopper from which seeds are discharged into a pressurized rotating drum having peripheral openings of a size smaller than the seed and countersunk to permit a single seed to lodge at an opening. The drum has a stationary end plate through which a delivery chute from the hopper extends and from which a plurality of outlet conduits to seed delivery means in respective row positions extend. The plate also mounts a brush adjacent to and in advance of the receiving end of the seed delivery means which is located at the upper part of the drum. The brush is designed to release surplus seeds from the drum adjacent each opening so that only a single seed is carried at each countersunk drum opening as it approaches a point of seed discharge to the seed delivery means. Roller means mounted exteriorly of the drum contact the drum at the seed carrying openings thereof at a position directly above the receiving end of the seed delivery means so as to release the seeds from the contacted openings to fall into the discharge chute.

A problem with planters of this type has been that the combined action of the air pressure within the rotating drum and of the agitation of seeds incident to the rotation of the drum frequently causes reattachment of seeds to the drum between the brush and the seed discharge point, so that multiple seeds frequently tend to be discharged simultaneously instead of discharge of a single seed from one aperture, thereby increasing the number of seeds planted in a given row, so that individual seeds as planted are not provided with adequate space for germination and growth, thus wasting seeds, reducing the size and strength of individual plants, and reducing crops.

It is the primary object of this invention to provide a planter which will overcome the disadvantages of prior planters as aforementioned.

A further object is to provide a planter of the rotating pressurized drum type with air permeable seed barrier means preventing attachment of seeds to the drum between an excess-seed-removing brush and the point of discharge of seeds from the drum.

A further object is to provide a device of this character which is simple in construction, readily applicable to existing planters, and which accommodates application of sufficient air pressure to seeds at the upper portion of a rotating drum in advance of a seed discharge position to retain the seeds for desired delivery to the discharge position.

Other objects will be apparent from the following specification.

DESCRIPTION OF THE PREFERRED EMBODIMENT

Figure 1:
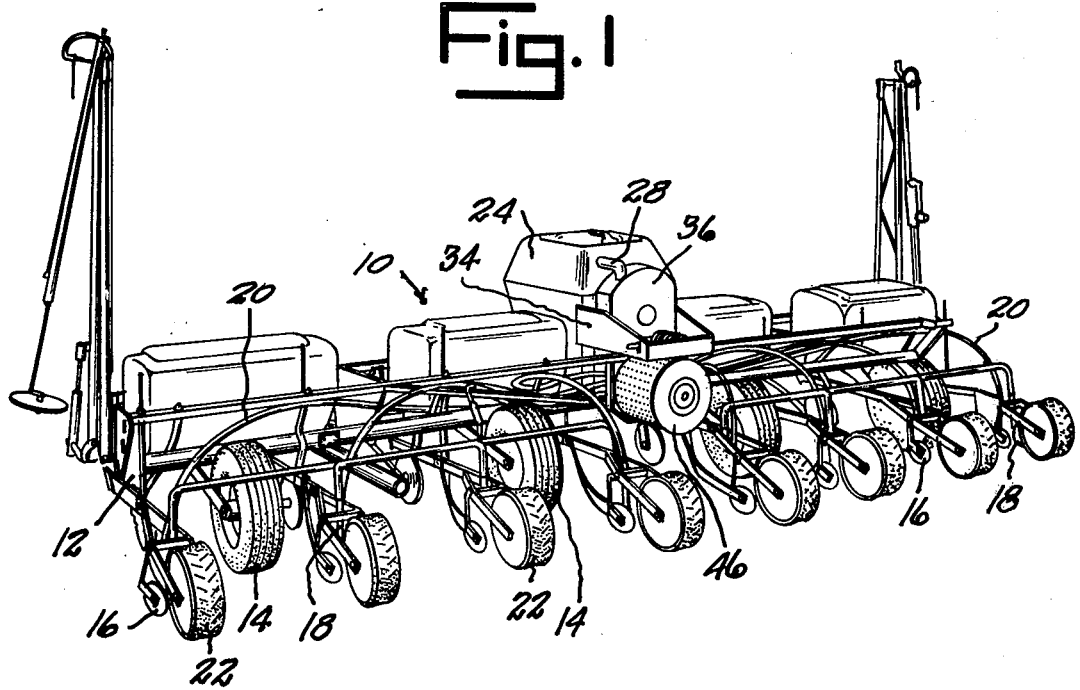
FIG. 1 is a perspective view of a typical row crop planter to which my invention is applicable.

Referring to the drawings, which illustrate one embodiment of the invention, the numeral 10 designates a row crop planter of conventional character to which my invention may be applied. The planter is characterized by a rigid frame 12 supported upon wheels 14 and provided with suitable tongue or hitch means (not shown) by which it may be towed. The frame is transversely elongated and preferably carries a plurality of spaced discs 16 whose spacing corresponds with the spacing of the rows to be planted and which serve to produce furrows at each row into which the seeds to be planted are discharged by any suitable discharge members 18, positioned slightly rearwardly relative to each disc 18 and supplied by a flexible seed delivery conduit 20. A press wheel 22 is carried by the frame rearwardly of each seed discharge member 18 and cooperates with the furrowing discs 16 to regulate the depth at which a seed is planted.

A seed hopper 24 is mounted upon the frame 12, preferably at a central elevated position as shown in FIG. 1. Hopper 24 is preferably sealed, as by a removable cover 26, except for an air intake line or conduit 28 and a seed discharge conduit 30. Discharge conduit 30 is preferably connected to a lower portion of the hopper adjacent an inclined bottom portion 32 thereof. The support for the hopper preferably includes a U-shaped frame part 34. Part 34 also supports a blower housing 36 in which is journaled a blower rotor 38 having any suitable driving means, such as a hydraulic motor (not shown) connected to a hydraulic pump (not shown) mounted upon a towing tractor (not shown).

Figure 2:
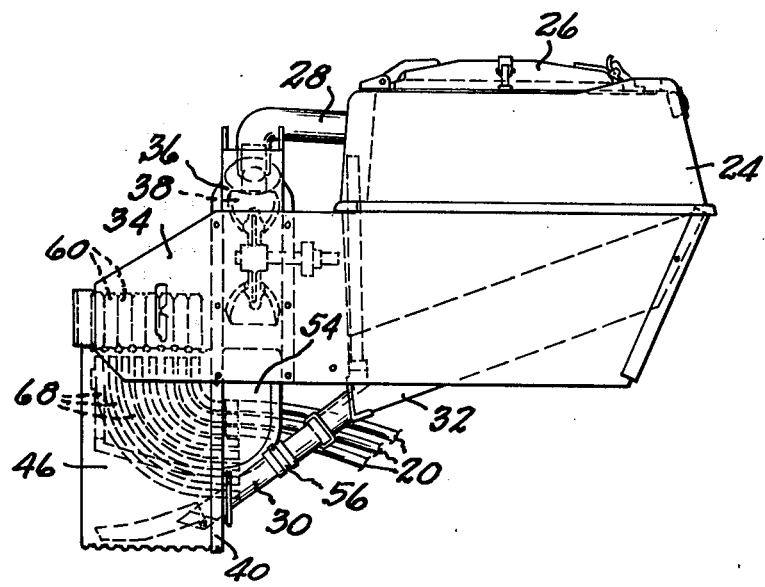
FIG. 2 is a detailed assembly view illustrating the relation of blower, hopper, rotating drum and discharge conduits characterizing my improved row planter.
Figure 3:
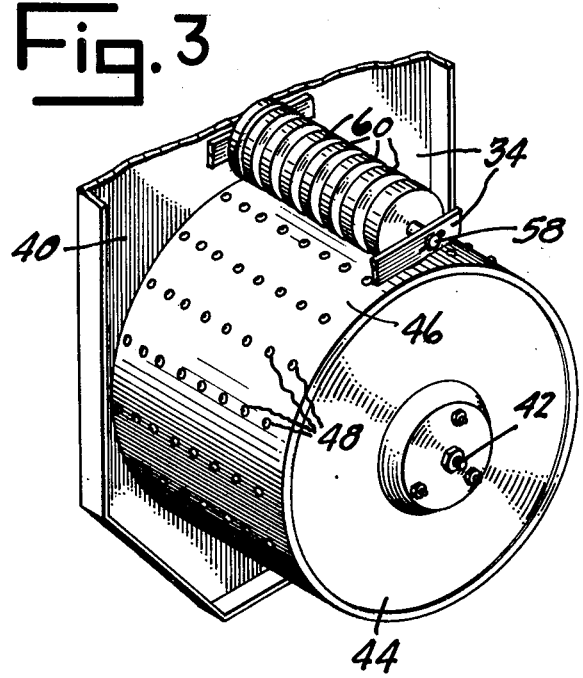
FIG. 3 is a perspective detail view illustrating the exterior of the seed distributing drum and seed releasing rollers.
Figure 5:
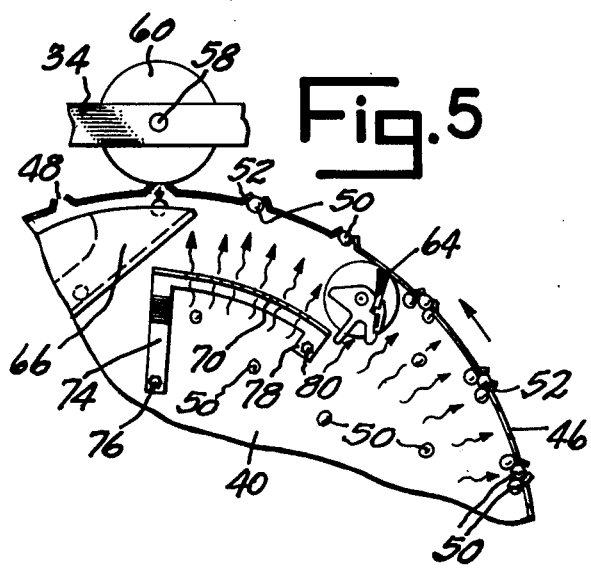
FIG. 5 is an enlarged fragmentary detail sectional view of a portion of the drum as seen in FIG. 4.

Frame part 34 preferably includes a depending plate portion 40 through which projects a shaft 42 which extends through and mounts the otherwise imperforate outer plate 44 of a seed drum 46. The seed drum 46 is substantially cup shaped and includes a seal (not shown) at its open end which is engageable with plate 40 to accommodate rotation of the drum 46 relative to the plate 40, while minimizing leakage of air between the drum and the plate 40. Any suitable means (not shown) are provided to rotate the drum. The peripheral or cylindrical portion of the drum is provided with a plurality of apertures 48, each of which is arranged in one of a plurality of circumferential series of substantially equi spaced apertures. The apertures 48 are of a size smaller than a seed 50 to be planted, and are formed centrally in an outwardly extending drum projection 52 within which a seed 50 may seat, as best illustrated in FIG. 5. The apertures 48 in different circumferential series may be aligned with holes in adjacent series as seen in FIG. 3, but this arrangement is not essential. An air duct 54 is provided for communication between the blower housing 36 and the seed drum 46, the same passing through the stationary plate 40 which preferably mounts air directing means (not shown) projecting into the drum 46. The point of discharge of air through duct 54 into the drum 46 is preferably located above the seed discharge conduit 30 which extends through the lower portion of the plate 40 and into the seed drum 46 as best seen in FIG. 2. It will be understood that the seed discharge conduit 30 will be provided with suitable seed delivery control means 56 which regulates the rate at which seed may flow from the seed hopper into the seed drum.

Figure 4:
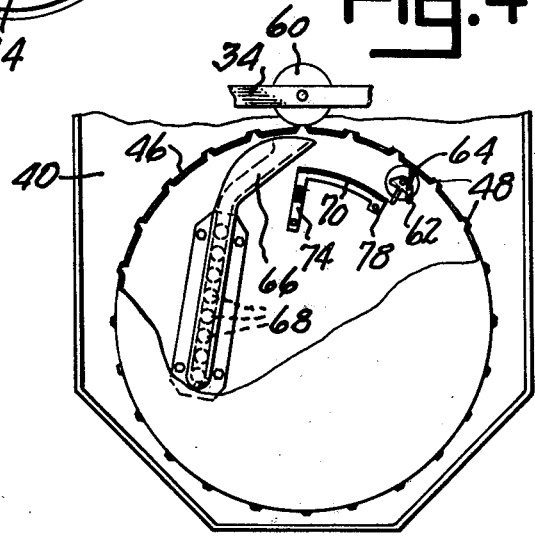
FIG. 4 is a vertical sectional view taken through the drum in a plane perpendicular to the axis of the drum along any selected series of drum openings and viewed toward a stationary end plate of the drum.

The frame part 34 journals a roller shaft 58 above the drum 46 and parallel to the longitudinal peripheral wall of the drum. Shaft 58 mounts a plurality of spaced rollers 60 whose spacing and positioning is such that each is aligned with the apertures 48 in one circumferential series. The rollers 60 preferably include resilient peripheral portions or may be formed entirely of resilient material. Each roller 60 is so positioned as to contact the raised or projecting portions 52 of the drum at a circumferential series thereof, as best illustrated in FIGS. 4 and 5. Preferably the rollers 60 are positioned to contact the projections 52 at the uppermost portion of the seed drum.

Plate 40 also mounts an adjustable support 62 for a brush 64 which extends lengthwise of the drum 46 within the drum at a point spaced from the rollers 60 in a counter-rotational direction, as best illustrated in FIG. 5. The brush 64 is positioned in contact with or adjacent to the inner surface of the drum in such a manner that it is capable of dislodging from the drum all seeds in excess of a single seed at or adjacent each aperture 48, thereby stripping excess seeds from the drum as the drum rotates toward the position of the rollers 60. It will be understood that the air pressure within the drum tends to force seeds outwardly in the drum at and around each of the apertures 48 and projections 52 of the drum. The brush 64 is positioned at the uppermost portion of the drum and serves to release and accommodate fall of excess seeds back into the lower protion of the drum.

The frame plate 40 mounts a seed discharge manifold 66 positioned below the rollers 60 and including a plurality of conduits 68 each located directly below a roller 60 and the holes of a selected one of the circumferential series of apertures 48 of the seed drum. Each of the conduits 68 has connection with a selected one of the seed delivery conduits 20 which extend to the respective seed discharge members 18.

In the operation of the device, the planter is towed by a tractor with which it has suitable power takeoff and-/or hydraulic connections for operation of the blower 38 and for rotation of the drum 46 as the planter moves across a field. Operation of the blower 38 introduces air under pressure into the seed hopper 24 through the conduit 28 and also introduces air under pressure through the duct 54 into the rotating seed drum 46. Thus, seed from the hopper is fed through the seed discharge conduit 30 into the drum 46 at a rate regulated by the seed delivery control means 56, being deposited at the bottom of the rotating seed drum 46 and exposed to the air pressure within drum 46 so as to cause one or a group of seeds 50 to be positioned at each drum aperture 48. At least one seed is seated in the drum projection 52 surrounding each drum aperture 48. The air pressure within the drum is sufficient to hold stationary during drum rotation the seeds which are adjacent each drum aperture 48, for example, during rotation in counterclockwise direction as illustrated by the arrow in FIG. 5, until such time as the excess seeds adjacent each aperture are engaged by the brush 64. The brush 64 strips or sweeps from the drum excess seeds, as shown at the lower right portion of FIG. 5, from their initial air-pressure retained position so that they may fall back into the lower portion of the drum. The single seed remaining in each drum projection 52 as that projection of the drum continues rotating after leaving the brush is held in the drum projection until a roller 60 is contacted by the drum projection. The contacting roller serves to seal the aperture of the contacted projection 52 and thereby dislodges the seed at the contacted apertured projection. The seed is then free to drop into the seed discharge manifold 66 for delivery through registering conduit 68 and thence to the connected conduit 20 for delivery to the connected seed discharge member 18.

In actual practice and usage, a condition is commonly encountered with devices of this character which is caused in part by the agitation of the seeds within the drum, particularly those released by the brush to fall back into the lower part of the drum, and in part by the pressurized air currents within the drum. This condition tends to cause seeds to move in various directions within the drum, including movement toward those openings 48 and projections 52 of the drum which are proceeding from the brush 64 toward the rollers 60. This results in frequent reattachment of seeds 50 to the previously brushed area of the drum. Such reattached seeds are discharged into the seed discharge manifold 66 as the associated drum projections 52 contact a roller 60. This results in the discharge of multiple seeds, rather than a single seed, from those projections 52 at or around which seeds have reattached. This action thereby increases the rate of seed delivery above the desired rate and changes the spacing of seeds in a row, so that plants in a row have inadequate space within which to grow and hence do not reach desired rates of growth and productivity, and seeds are therefore wasted.

The present invention is designed to improve planters of the character described above, while retaining the desired functioning and advantages thereof, in a manner to avoid the above described operating characteristic which results in undesired multiple seeds being discharged from the drum into conduits 68 and through manifold 66. The improvement contemplates the provision of an air permeable seed barrier positioned between the brush 64 and the seed discharge manifold 66. This barrier may be formed of fabric, wire mesh, perforated sheet metal or any other material found suitable.

Figure 6:
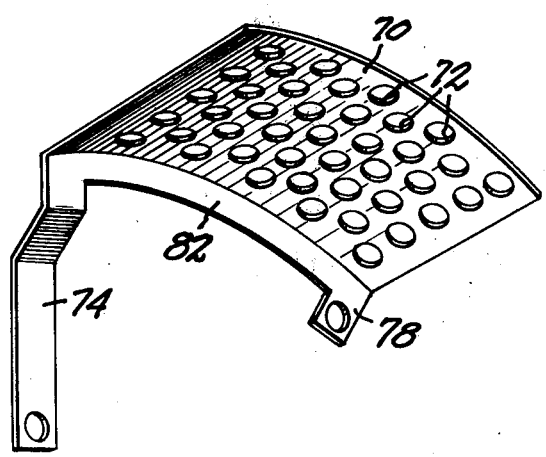
FIG. 6 is a perspective view of a seed barrier to be mounted upon the stationary end plate of the drum in the position illustrated in FIGS. 4 and 5.

One embodiment of the barrier is illustrated in FIGS. 4, 5 and 6 of the drawings and constitutes a sheet metal plate 70 of a size to extend between carrier 62 of brush 64 and the seed discharge manifold 66 and from the plate 40 to a position adjacent the outer plate 44 of the drum 46. Plate 70 is provided with a plurality of apertures 72, preferably distributed uniformly throughout the same. An arm 74 projects from one end of the plate 70 and is fixedly secured to the plate 40 at 76. A second arm 78 projects from the other end of the plate 72 and is fixedly secured to the plate 40 at 80. The plate may be provided with reinforcing means, such as a flange 82.

The apertures of the barrier 72 will be of a size smaller than a seed 50 being planted so as to prevent passage of seeds therethrough. At the same time, air may flow through the plate or barrier at a rate sufficient to ensure that air under pressure will exist in the zone within the drum between brush 64, manifold 66 and barrier plate 70 and sufficient to maintain seeds 50 in the projections 52 of the drum at the upper portion thereof between the brush 64 and the manifold 66. This ensures that the single seed in each projection 52 of the drum remaining after excess seeds have been released by the brush 64 will remain in place until reaching the discharge position determined by the location of the roller 60 and the mouth of the seed discharge manifold 66.

While the preferred embodiment of the invention has been illustrated and described, it will be understood that changes within the scope of the appended claims may be made without departing from the spirit of the invention.

What I claim is:

1. In a row crop planter comprising a rotatable seed drum having a plurality of circumferential peripheral series of apertures surrounded by seed-receiving projections, means for delivering seed into said drum, means for discharging air under pressure into said drum to position and retain seeds at and adjacent each aperture as the drum rotates, roller means positioned exteriorly of and above said drum and engageable with said projections, collecting and distributing means positioned within said drum below said roller means, and a brush within the upper part of said drum in counter-rotational spaced relation to said roller means for engaging and releasing into the lower position of said drum seeds in excess of a single seed positioned at and adjacent each projection, the improvement comprising an air permeable seed barrier positioned in said drum between said collecting and distributing means and said brush to prevent reattachment of seeds at the portion of the drum between the brush and the distributing means.

2. The improved planter defined in claim 1, wherein said seed barrier is positioned spaced below the portion of said drum between said collecting and distributing means and said brush.

3. The improved planter defined in claim 1, wherein said seed barrier has a rigid shape-retaining and positioning means.

4. The improved planter defined in claim 1, wherein said seed barrier is rigid.

5. The improved planter defined in claim 1, wherein said seed barrier is a rigid sheet member having a plurality of spaced apertures each of a size smaller than a seed.

6. The improved planter defined in claim 1, wherein said seed barrier constitutes a perforated metal sheet having a marginal reinforcing flange.

7. The improved planter defined in claim 1, wherein said drum is open at one end which is spanned by a stationary member which mounts said collecting and distributing means, said brush and said seed barrier.

8. The improved planter defined in claim 7, wherein said seed barrier constitutes a perforated metal sheet having projecting brackets secured to said stationary member.

* * * * *

REEXAMINATION CERTIFICATE (18th)

United States Patent [19]
Parks, Jr.

[11] B1 4,148,414
[45] Certificate Issued Sep. 21, 1982

[54] ROW CROP PLANTER

[76] Inventor: Earl R. Parks, Jr., 0141 W Rd. 700S, LaPorte, Ind. 46350

Reexamination Request
No. 90/000,033, Jul. 23, 1981

Reexamination Certificate for:
Patent No.: 4,148,414
Issued: Apr. 10, 1979
Appl. No.: 856,264
Filed: Dec. 1, 1977

[51] Int. Cl.³ .............................................. B65H 3/08
[52] U.S. Cl. ..................................................... 221/278
[58] Field of Search ................. 221/160, 161, 162, 278, 221/251, 254, 211

[56] References Cited

U.S. PATENT DOCUMENTS

| 1,734,261 | 11/1929 | Larson. | |
|---|---|---|---|
| 1,879,111 | 9/1932 | Crandall. | |
| 3,637,108 | 1/1972 | Loesch | 221/211 |
| 3,770,164 | 11/1973 | Hembree | 221/211 |
| 3,860,146 | 1/1975 | Bauman | 221/211 |

Primary Examiner—Stanley H. Tollberg

[57] ABSTRACT

A row crop planter of the type having a rotating pressurized peripherally apertured seed drum within which are positioned seed distributing structure and a brush for releasing excess seeds from the drum in advance of the distributing structure, which is improved by the provision of air permeable a seed barrier located in the drum to prevent reattachment of seeds to the portion of the drum between the brush and the distributing structure.

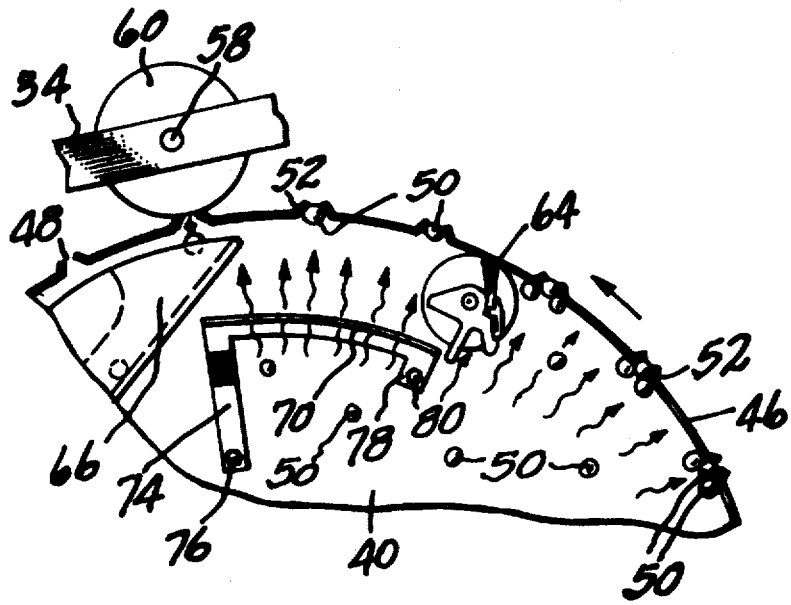

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–3 is confirmed.

* * * * *